United States Patent Office 3,066,101
Patented Nov. 27, 1962

3,066,101
LUBRICATING OIL COMPOSITIONS CONTAINING POLY(DIPHENYLALKANE - p - XYLYLENES) AS VISCOSITY INDEX IMPROVING AGENTS
Donovan R. Wilgus, Richmond, Calif., assignor, by mesne assignments, to the United States of America as represented by the United States Atomic Energy Commission
No Drawing. Filed Aug. 11, 1960, Ser. No. 48,839
6 Claims. (Cl. 252—59)

This invention relates to lubricating oil compositions containing new compositions of matter to improve the viscosity index characteristics thereof; in particular, this invention is directed to lubricating oil compositions containing new compositions of matter which are effective to improve the viscosity-temperature characteristics thereof.

This application is a continuation-in-part of patent application Serial No. 773,160, filed November 12, 1958, and now abandoned.

The greater proportion of oils obtainable by refining processes and useful as base oils for lubricating oil compositions have wide variations in viscosity characteristics with changes in temperature. They do not have agents specifically incorporated therein for the purpose of imparting reduced changes in viscosity with changes in temperature. That is, at a particular temperature, a lubricating oil may be quite viscous, while at higher temperatures the lubricating oil may have a viscosity of a fluid such as kerosene. In order that the viscosity of a lubricating oil composition will not change rapidly with changes in the temperature of an internal combustion engine, for example, numerous additives have been designed to modify the viscosity-temperature characteristics of lubricating oils. The changes in the viscosity occurring with variations in temperature are kept at a minimum.

Polymeric additives in general are used to improve the viscosity-index characteristics of lubricating oil compositions. Such polymeric additives include, for example, alkyl methacrylate polymers (e.g., polybutyl methacrylate), and polyolefins (e.g., polybutenes). These additives are known to improve the viscosity-temperature relationships of lubricating oils.

The art is replete with numerous viscosity index improving agents. However, known viscosity index improving agents (e.g., polyalkylmethacrylates) decompose at high temperatures.

Thus, it is a primary object of this invention to set forth lubricating oil compositions containing new compositions of matter which are thermally stable and which improve the viscosity-temperature characteristics thereof; that is, lubricating oil compositions containing new compositions of matter which increase the viscosity index thereof, including lubricating oil compositions used in an atmosphere of nuclear radiation.

In accordance with this invention, it has been discovered that the viscosity index of lubricating oil compositions is increased by incorporating therein α,ω-diphenylalkane-p-xylylene copolymers (i.e., poly(α,ω-diphenylalkane-p-xylylenes).

The diphenylalkane-p-xylylene copolymers are described by the formula:

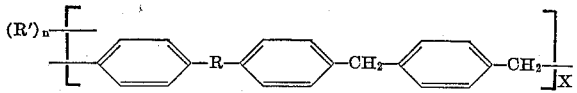

wherein R represents a saturated hydrocarbon radical containing from 1 to 10 carbon atoms, R' is an alkyl group containing from 4 to 12 carbon atoms, n is a number from 0 to 3, and X is a number representing the number of monomeric units in the polymer.

It is preferred that R is an alkylene radical containing from 1 to 10 carbon atoms, and that R' is an alkyl radical containing from 4 to 12 carbon atoms. Examples of R radicals include methylene, propylene, butylene, octylene and decylene, etc.; of R' radicals include butyl, hexyl, octyl, decyl, dodecyl, etc.

The α,ω-diphenylalkane-p-xylylene copolymers can be prepared by reacting an α,ω-diphenylalkane with an α,α'-dichloro-p-xylene in the presence of a Friedel-Crafts catalyst as represented by the following equation:

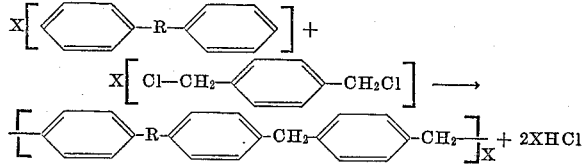

wherein R and X are the same as described hereinabove.

The polymer thus prepared can be alkylated by known alkylation procedures to obtain an alkylated poly(α,ω-diphenylalkane-p-xylylene).

The polymeric materials described herein can be prepared by bulk or solution Friedel-Crafts polymerization reactions. The Friedel-Crafts catalysts which can be used include ferric chloride, aluminum chloride, aluminum bromide, etc. Such catalysts are used in amounts of about 0.01% to about 1.0%, by weight. The mol ratio of diphenylalkane to α,α'-dichloro-p-xylene can be in the range of 10:1 to 1:1, preferably from 1.2:1.

A diphenylalkane will react with α,α'-dichloro-p-xylene at temperatures ranging from 65° C. to 150° C. For best results in this reaction, it is preferred to use temperatures ranging from 90° C. to 120° C.

The various solvents which can be used in the polymerization reactions include chloroform, o-dichlorobenzene, nitrobenzene, etc.

The molecular weights of the resulting polymeric compounds range from about 10,000 to about 50,000 or higher.

As V.I. improving agents, the new products described herein can be used in amounts of 1% to 20%, by weight, in a wide variety of oils, including mineral oils, such as naphthenic base, paraffin base, and mixed base, other hydrocarbon lubricants, e.g., lubricating oils derived from coal products, and synthetic oil, e.g., alkylene polymers (such as polymers of propylene, butylene, etc., and mixtures thereof), alkylene oxide-type polymers, dicarboxylic acid esters (e.g., dibutyl adipate, di-hexyl adipate, di-2-ethylhexyl sebacate, etc.), liquid esters of acids of phosphorus, alkyl benzenes (e.g., dodecylbenzene), polymers of silicon (e.g., poly(methyl, phenyl) siloxane, tetraethyl silicate, etc.), polyphenyls (e.g., biphenyls and terphenyls), alkyl biphenyl ethers, etc. Synthetic oils of the alkylene oxide-type polymers which may be used include those exemplified by the alkylene oxide polymers (e.g., propylene-oxide polymers) and derivatives, including alkylene oxide polymers prepared by polymerizing the alkylene oxides, e.g., propylene oxide in the presence of water or alcohols, e.g., ethyl alcohol, esters of ethylene oxide-type polymers, e.g., acetylated ethylene oxide polymers prepared by acetylating ethylene oxide polymers containing hydroxyl groups; polyethers prepared from ethylene glycols, e.g., ethylene glycol.

The above base oils may be used individually as such, or in various combinations, wherever miscible or wherever made so by the use of mutual solvents.

The viscosity index improving agents described herein can be prepared by reacting an α,ω-diphenylalkane with α,α'-dichloro-p-xylene, using, as a catalyst, from 0.01% to 1.0%, by weight of anhydrous aluminum chloride based on the total weight of diphenylalkane and α,α'-dichloro-p-xylene, at temperatures from 65° C. to 150°

C. for a period of time from 0.5 hour to 30 hours. The resulting reaction mixtures can be dissolved in benzene, and the resulting composition filtered. An acetone-methanol blend (2 parts by volume of methanol per volume of acetone) is added to the benzene solution to precipitate the polymer. The polymers are redissolved in benzene and reprecipitated with an acetone-methanol blend. The resulting products can be dried in a vacuum oven at temperatures of about 100° C.

The examples hereinbelow illustrate the preparation of α,ω-diphenylalkane-p-xylylene copolymers.

Table I hereinbelow sets forth the physical characteristics of the various polymeric compounds prepared according to this invention.

TABLE I

| Copolymer | Type of Polymerization | Viscosity (cs.) At 100° F. (10% by Wt. in Toluene) | Percent Polymer | Blends in $C_{14}$–$C_{16}$ Alkyl Diphenyl Ether | | |
|---|---|---|---|---|---|---|
| | | | | Viscosity (cs.) | | V.I. |
| | | | | 210° F. | 100° F. | |
| 1,9-Diphenylnonane-p-xylylene | Solution | 4.88 | 5 | 9.04 | 51.6 | 143 |
| | | | 10 | 16.5 | 96.4 | 144 |
| | | | 15 | 31.1 | 193 | 139 |
| | do | 3.35 | 5 | 7.55 | 44.0 | 134 |
| | | | 10 | 11.8 | 73.2 | 140 |
| | | | 15 | 17.0 | 113 | 138 |
| Alkylated ($C^{12}$) diphenylmethane-p-xylylene | do | 6.29 | [1] 5 | 5.10 | 15.2 | 218 |
| None | | | | 4.83 | 26.8 | 114 |

[1] 1,9-diphenylnonane (V.I.=124).

EXAMPLE I 175 grams (1 mol) of α,α'-p-dichloroxylene, 202 grams (1.2 mol) of diphenylmethane, 600 cc. O-dichlorobenzene, 100 cc. of chloroform, 0.05 gram of ferric oxide, and 0.01 gram of ferric chloride were blended together. This mixture was heated on a steam plate at temperatures of about 80° C. to 105° C. for 2 hours. The product thus formed was dissolved in 300 cc. xylene. The xylene solution was heated at 105° C. for 4 hours, then heated at 127° C. to 133° C. for 4 hours, and filtered through Celite. An acetone-methanol blend was added

*Alkylated Poly(Diphenylmethane-p-Xylylene)* to the xylene solution to precipitate the reaction product, which was recovered, redissolved in xylene, reprecipitated with an acetone-methanol blend, and dried in vacuo at 100° C.

A mixture of 10 grams of the above product was dissolved in 90 grams of O-dichlorobenzene. 26 grams of propylene tetramer ($C_{12}$) were added, and the mixture was cooled to 2–5° C. temperature, after which was added 150 cc. anhydrous hydrofluoric acid. The mixture was agitated at that temperature for 4 hours.

Hydrofluoric acid drained off; and the reaction mixture was poured into cold caustic to neutralize residual hydrofluoric acid. The organic layer was water washed, after which the alkylated polymer was precipitated with ethanol. The polymer was dissolved in benzene, and reprecipitated with ethanol and dried in vacuo.

EXAMPLE II

*Poly(1,9-Diphenylnonane-p-Xylylene)*

A mixture of 88 grams (0.5 mol) of α,α'-dichloro-p-xylene, 168 grams (0.6 mol) of 1,9-diphenylnonane, 30 cc. chloroform, and 50 cc. of O-dichlorobenzene was charged to a reaction vessel. To this mixture was added 1% ferric oxide and a trace of anhydrous ferric chloride. This mixture was heated on a steam plate for a short period of time at a temperature of about 105° C. 500 cc. of xylene and 1 gram of anhydrous aluminum chloride were added and the mixture heated at 105° C. for 3 hours. Benzene was added and the whole mixture was filtered. The filtrate was washed with dilute hydrochloric acid, water, and sodium bicarbonate, then dried over sodium sulfate. The polymer was precipitated by adding a blend of 2 parts by volume of methanol with 1 part by volume of acetone. The polymer was redissolved in benzene and reprecipitated with a methanol-acetone blend.

As stated hereinabove, the new V.I. improving agents described herein are of greater thermal stability than prior V.I. improving agents. In order to determine the thermal stability thereof, the new compounds were incorporated in a base oil consisting of an alkyl diphenyl ether, wherein the alkyl group was derived from polypropenes having an average of 12–14 carbon atoms. The resulting solution was heated at 500° F. for a period of 66 hours, after which the viscosities of the oil were determined. The results of such testing are presented in Table II hereinbelow.

TABLE II

| V.I. Improving Agent | Concentration (Wt. percent) | Test Time (Hours) | Viscosity Before Test | | Viscosity (cs.) After Test | | | |
|---|---|---|---|---|---|---|---|---|
| | | | 100° F. | 210° F. | 100° F. | Percent Change | 210° F. | Percent Change |
| [1] | 5 | 66 | 52.1 | 9.07 | 445 | −14.5 | 7.57 | −16.5 |

[1] 1,9-diphenylnonane-p-xylylene copolymer.

I claim:

1. A lubricating oil composition comprising a major proportion of an oil of lubricating viscosity, and from 1% to 20%, by weight, of a poly(α,ω-diphenylalkane-p-xylylene) of the formula:

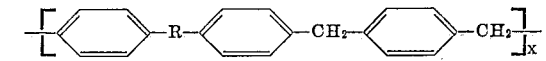

wherein R is a hydrocarbon radical containing from 1 to 10 carbon atoms, and X is a number representing the number of monomeric units present in the polymer having a molecular weight in the range of about 10,000 to about 50,000 wherein said poly(α,ω-diphenylalkane-p-xylylene) was prepared by reacting an α,ω-diphenylalkane with an α,α'-dichloro-p-xylene in the presence of a Friedel-Crafts catalyst.

2. A lubricating oil composition comprising a major proportion of an oil of lubricating viscosity, and from 1% to 20%, by weight, of a poly(α,ω-diphenylalkane-p-xylylene) of the formula:

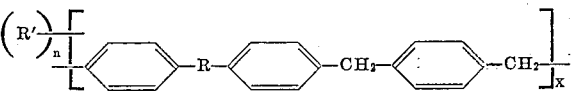

wherein R is a hydrocarbon radical containing from 1 to 10 carbon atoms, R' is an alkyl group containing from 4 to 12 carbon atoms, n is a number from 0 to 3, and X is a number representing the number of monomeric units in the polymer having a molecular weight in the range of about 10,000 to about 50,000 wherein said poly(α,ω-diphenylalkane-p-xylylene) was prepared by reacting an α,ω-diphenylalkane with an α,α'-dichloro-p-xylene in the presence of a Friedel-Crafts catalyst followed by alkylation.

3. A lubricating oil composition comprising a major proportion of an oil of lubricating viscosity, and from 5% to 15% by weight, of a poly(α,ω-diphenylalkane-p-xylylene) of the formula:

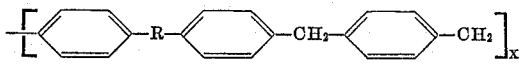

wherein R is a hydrocarbon radical containing from 1 to 10 carbon atoms, and X is a number representing the number of monomeric units present in the polymer having a molecular weight in the range of about 10,000 to about 50,000 wherein said poly(α,ω-diphenylalkane-p-xylylene) was prepared by reacting an α,ω-diphenylalkane with an α,α'-dichloro-p-xylene in the presence of a Friedel-Crafts catalyst.

4. A lubricating oil composition comprising a major proportion of an oil of lubricating viscosity and from 1% to 20% by weight of a poly(α,ω-diphenylnonane-p-xylylene) of the formula:

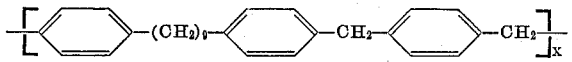

wherein X is a number representing the number of monomeric units present in the polymer having a molecular weight in the range of about 10,000 to about 50,000, wherein said poly(α,ω-diphenylnonane-p-xylylene) was prepared by reacting α,ω-diphenylnonane with an α,α'-dichloro-p-xylene in the presence of a Friedel-Crafts catalyst, wherein said base oil consists essentially of an alkyl diphenyl ether.

5. A lubricating oil composition comprising a major proportion of an oil of lubricating viscosity and from 1% to 20% by weight of a poly(α,ω-diphenylnonane-p-xylylene) of the formula:

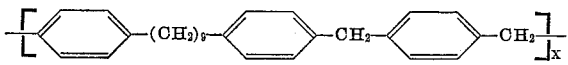

wherein X is a number representing the number of monomeric units present in the polymer having a molecular weight in the range of about 10,000 to about 50,000, wherein said poly(α,ω-diphenylnonane-p-xylylene) was prepared by reacting α,ω-diphenylnonane with an α,α'-dichloro-p-xylene in the presence of a Friedel-Crafts catalyst, wherein said base consists essentially of a petroleum lubricating oil.

6. A lubricating oil composition comprising a major proportion of an oil of lubricating viscosity, and in an amount sufficient to improve the viscosity index thereof, a poly(α,ω-diphenylnonane-p-xylylene) of the formula:

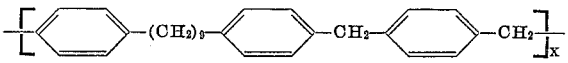

wherein X is a number representing the number of monomeric units present in the polymer having a molecular weight in the range of about 10,000 to about 50,000, wherein said poly(α,ω-diphenylnonane-p-xylylene) was prepared by reacting α,ω-diphenylnonane with an α,α'-dichloro-p-xylene in the presence of a Friedel-Crafts catalyst.

References Cited in the file of this patent
UNITED STATES PATENTS

| | | |
|---|---|---|
| 2,292,164 | Sibley | Aug. 4, 1942 |
| 2,712,532 | Szwarc et al. | July 5, 1955 |
| 2,870,098 | Martin et al. | Jan. 20, 1959 |

UNITED STATES PATENT OFFICE
CERTIFICATE OF CORRECTION

Patent No. 3,066,101                      November 27, 1962

Donovan R. Wilgus

It is hereby certified that error appears in the above numbered patent requiring correction and that the said Letters Patent should read as corrected below.

Column 3, line 40, strike out the heading "Alkylated Poly(Diphenylmethane-p-Xylylene)", in italics, and insert the same under "EXAMPLE I" in line 29, same column 3.

Signed and sealed this 11th day of June 1963.

(SEAL)
Attest:

ERNEST W. SWIDER
Attesting Officer

DAVID L. LADD
Commissioner of Patents